(12) United States Patent
Pellegatti et al.

(10) Patent No.: US 10,544,271 B2
(45) Date of Patent: *Jan. 28, 2020

(54) COPOLYMERS OF PROPYLENE WITH HEXENE-1 AND BLOWN FILMS OBTAINED FROM THEM

(71) Applicant: BASELL POLIOLEFINE ITALIA S.R.L., Milan (IT)

(72) Inventors: Giampaolo Pellegatti, Boara (IT); Michele Grazzi, Ferrara (IT); Nicolas Kokel, Rhode Saint-Genese (BE); Antonella Angelini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,014

(22) Filed: Feb. 16, 2017

(65) Prior Publication Data

US 2017/0158832 A1 Jun. 8, 2017

Related U.S. Application Data

(62) Division of application No. 12/735,148, filed as application No. PCT/EP2008/065907 on Nov. 20, 2008, now Pat. No. 9,611,338.

(60) Provisional application No. 61/008,476, filed on Dec. 20, 2007.

(30) Foreign Application Priority Data

Dec. 18, 2007 (EP) .................... 07150085

(51) Int. Cl.
| | | |
|---|---|---|
| *C08J 5/18* | (2006.01) | |
| *B29C 48/10* | (2019.01) | |
| *B29C 48/88* | (2019.01) | |
| *C08F 210/06* | (2006.01) | |
| *C08F 10/00* | (2006.01) | |
| *B29C 49/00* | (2006.01) | |
| *B29C 49/04* | (2006.01) | |
| *B29C 49/64* | (2006.01) | |
| *B29C 48/00* | (2019.01) | |
| *B29C 48/21* | (2019.01) | |
| *B29K 23/00* | (2006.01) | |
| *B29K 105/00* | (2006.01) | |

(52) U.S. Cl.
CPC .............. *C08J 5/18* (2013.01); *B29C 48/10* (2019.02); *B29C 48/914* (2019.02); *B29C 49/0015* (2013.01); *B29C 49/0047* (2013.01); *B29C 49/04* (2013.01); *B29C 49/64* (2013.01); *C08F 10/00* (2013.01); *C08F 210/06* (2013.01); *B29C 48/0018* (2019.02); *B29C 48/0019* (2019.02); *B29C 48/0022* (2019.02); *B29C 48/21* (2019.02); *B29C 48/912* (2019.02); *B29C 2793/0063* (2013.01); *B29K 2023/0641* (2013.01); *B29K 2023/086* (2013.01); *B29K 2023/12* (2013.01); *B29K 2023/14* (2013.01); *B29K 2105/256* (2013.01); *C08J 2323/14* (2013.01)

(58) Field of Classification Search
CPC .. Y10T 428/1352; C08F 10/00; C08F 210/06; C08F 210/14; C08F 2500/12; C08F 2500/15; C08F 2500/26; C08J 5/18; C08J 2323/14; B29C 47/8825; B29C 47/0057; B29C 47/002; B29K 2023/12; B29K 2105/256
USPC .............. 428/35.7, 220; 524/579; 526/124.3, 526/348.5
See application file for complete search history.

(56) References Cited

U.S. PATENT DOCUMENTS

| | | |
|---|---|---|
| 4,399,054 A | 8/1983 | Ferraris et al. |
| 5,095,153 A | 3/1992 | Agnes et al. |
| 5,310,950 A | 5/1994 | Mannion |
| 6,172,172 B1 | 1/2001 | Burgin et al. |
| 6,211,295 B1 | 4/2001 | Burgin et al. |
| 6,747,103 B1 | 6/2004 | Vestberg et al. |
| 6,812,287 B2 | 11/2004 | Obata et al. |
| 6,818,583 B1 | 11/2004 | Morini et al. |
| 7,022,640 B2 | 4/2006 | Morini et al. |
| 7,038,000 B2 | 5/2006 | Vestberg et al. |
| 7,049,377 B1 | 5/2006 | Morini et al. |
| 7,138,469 B2 | 11/2006 | Collina et al. |
| 7,449,534 B2 | 11/2008 | Lehmus et al. |
| 2002/0004560 A1 | 1/2002 | Christie et al. |
| 2003/0216521 A1* | 11/2003 | Obata .................. C08J 5/18 525/240 |
| 2004/0010087 A1 | 1/2004 | Obata et al. |
| 2004/0158010 A1 | 8/2004 | Lehmus et al. |
| 2004/0176551 A1 | 9/2004 | Vestberg et al. |
| 2007/0082185 A1 | 4/2007 | Ikeno et al. |
| 2007/0129513 A1 | 6/2007 | Lehmus et al. |
| 2007/0196608 A1 | 8/2007 | De Palo et al. |
| 2008/0015316 A1 | 1/2008 | Lin et al. |

(Continued)

FOREIGN PATENT DOCUMENTS

| | | |
|---|---|---|
| CN | 1443800 A | 9/2003 |
| CN | 1461768 A | 12/2003 |
| CN | 1973160 A | 5/2007 |

(Continued)

*Primary Examiner* — Ruiyun Zhang

(57) ABSTRACT

A copolymer of propylene with hexene-1 containing from 5 to 9% by weight of recurring units derived from hexene-1, having a melting temperature from 125 to 140° C. and Melt Flow Rate (ASTM D1238, 230/2.16 Kg) from 0.1 to 3 g/10 min., is used to produce blown films having valuable mechanical and optical properties.

10 Claims, No Drawings

(56) References Cited

U.S. PATENT DOCUMENTS

2009/0030098 A1  1/2009  Cagnani et al.

FOREIGN PATENT DOCUMENTS

| | | |
|---|---:|---|
| EP | 45977 A2 | 2/1982 |
| EP | 361493 A1 | 4/1990 |
| EP | 728769 A1 | 8/1996 |
| JP | H0691752 A | 4/1994 |
| JP | 2000501140 A | 2/2000 |
| JP | 2002542347 A | 12/2002 |
| JP | 2004315625 A | 11/2004 |
| JP | 2005513213 A | 5/2005 |
| WO | WO-9719991 A1 | 6/1997 |
| WO | WO-9720888 A1 | 6/1997 |
| WO | WO-97020889 A1 | 6/1997 |
| WO | WO-02090400 A1 | 11/2002 |
| WO | WO-02090440 A1 | 11/2002 |
| WO | WO-2006002778 A1 | 1/2006 |
| WO | WO-07003523 A1 | 1/2007 |
| WO | WO-200700523 A2 | 1/2007 |

* cited by examiner

COPOLYMERS OF PROPYLENE WITH HEXENE-1 AND BLOWN FILMS OBTAINED FROM THEM

This application is a Divisional Application that claims benefit to U.S. Non-Provisional application Ser. No. 12/735,148, filed Jun. 18, 2010, that is the U.S. National Phase of PCT International Application PCT/EP2008/065907, filed Nov. 20, 2008, claiming the benefit of 35 USC 119(e) 61/008,476, filed Dec. 20, 2007, claiming priority of European Patent Application No. 07150085.4, filed Dec. 18, 2007, the contents of which are incorporated herein by reference in its entirety.

The present invention relates to copolymers of propylene with hexene-1, particularly suited for preparing blown films, and to the blown films comprising such copolymers.

The blown films sector constitutes an area of ever-increasing importance in various application segments, such as industry packaging, consumer packaging, bags and sacks, lamination films, barrier films, packaging of medical products, agriculture films, hygienic products and products packaging.

One of the reasons for this is that the films obtained by blowing have a tubular shape which makes them particularly advantageous in the production of bags for a wide variety of uses (bags for urban refuse, bags used in the storage of industrial materials, for frozen foods, carrier bags, etc.) as the tubular structure enables the number of welding joints required for formation of the bag to be reduced when compared with the use of flat films, with consequent simplification of the process. Moreover, the versatility of the blown-film technique makes it possible, simply by varying the air-insufflation parameters, to obtain tubular films of various sizes, therefore avoiding having to trim the films down to the appropriate size as is necessary in the technique of extrusion through a flat head.

Blown film orientation, which is an essential parameter for mechanical performance, can be balanced between film extrusion and film cross directions by the correct choice of processing parameters such as blow-up ratio, draw-down ratio, air cooling intensity and distribution and extrusion speed. This comes in combination with the use of low fluidity materials to provide superior film mechanical performance compared to the cast film process; in fact, cast films are based on high fluidity, low molecular weight thermoplastic resins and are usually strongly oriented in machine direction, which is the reason for mechanical weakness such as easy tear propagation in the extrusion direction.

In addition, blown films have homogeneous mechanical properties in cross direction in contrast to cast films, the mechanical performance of which is not constant over the web width due to melt distribution and temperature variations resulting from film extrusion through a flat die.

The blown film gauge variation in transverse direction is easily distributed and equalized with the help of reversing haul-off devices, which enables the production of perfectly cylindrical reels without the occurrence of "piston rings"; on the other hand, in the case of the cast film process, for instance, due to linear film movement resulting from film extrusion making use of a flat die, gauge variations can not be distributed on wide distances but only slightly shifted left and right by a tiny transversal oscillation of the winding device, which may lead to reels of films with an imperfect shape.

Also in the case of cast films, good reel quality and acceptable film properties in the transverse direction can be achieved only by trimming the edge beads from the flat film; the edge trim material is either discarded or recycled, which comes at a cost, or re-fed into the extrusion process, which adds complexity to the cast film process and may also generate quality problems due to multiple pass of thermoplastic resins through the extruder. In addition, edge trim refeeding is more complicated in the case of multi-layered films due to the choice of the film layer in which the edge trim material must be added. In the case of multilayered barrier films which contain one or more non-polyolefinic resin such a polyamide, EVOH or so called tie layer material, edge trim is usually discarded since it can not be refed or recycled due to quality considerations, which is an additional cost burden related to the cast film process. On the other hand, blown films exhibit constant properties and film thickness in transverse direction and therefore do not require edge trimming, which saves cost, material and avoids technical complications such as edge trim refeeding and associated quality issues.

The most common thermoplastic resins used in the production of blown films belong to the polyethylene family of products, such as LDPE, LLDPE, MDPE or HDPE, or mixtures therefrom, since these polyethylene resins are endowed with properties in the molten state which enables films to be obtained with a high level of production efficiency and in a very wide range of thicknesses, without compromising the stability of the bubble. However by using polyethylene materials it is still not possible to achieve a fully satisfactory balance of high stiffness, high clarity, good mechanical properties and high thermal resistance. Thus it would be desirable to produce blown films made of or comprising polymer materials capable of providing the said balance to a higher level. In particular, polypropylene would be an ideal candidate, because it is known to provide improved stiffness and yield strength, even at temperatures above room temperature.

The use of polypropylene-based polymers in blown films, on the other hand, is particularly difficult given the poor processability properties of polypropylene which give rise to frequent tearing of the bubble, requiring reduction of the process throughput, or, in any case, to excessive orientation of the film, resulting in an impact resistance and a resistance to tear propagation in the machine direction which are so low as to render it unusable. Useful solutions are proposed in WO9720888 and WO97020889, wherein blown films prepared from complex blends are disclosed.

However the films disclosed in the said documents are not yet fully satisfactory because the throughput achievable on blown film lines is not yet at the level which can be obtained with polyethylene resins. In addition, comparatively good mechanical performance is achieved by the incorporation of high level of soft modifier resins which lower the film stiffness required for downgauging and material saving in downstream applications and uses, also impairing the thermal film stability compared to the non-modified polypropylene-based film. It is also required to carry out complex blending operations.

It is therefore seen that there is a need for a polyolefin material which at the same time is of good processability on blown-film production lines under high throughput conditions and is capable of providing films with valuable mechanical properties together with good stiffness and thermal resistance.

Now it has surprisingly been found that a good balance of mechanical properties, in particular of impact resistance (e.g. dart drop impact strength) and resistance to tear propagation, can be obtained in blown films made from new specific copolymers of propylene with hexene-1. Due to the relatively low amounts of hexene-1, such copolymers also maintain the resistance to thermal deformation which is typical for propylene polymers. Moreover, the said films show good optical properties, in particular haze and gloss, and are easily obtainable by processing the copolymers of the present invention in the existing blown film lines.

Thus the present invention provides a copolymer of propylene with hexene-1 containing from 5 to 9% by weight, preferably from 5.5 to 9% by weight, more preferably from 6 to 9% by weight, in particular from 6.5 to 9% by weight, of recurring units derived from hexene-1, said copolymer having a melting temperature from 125° C. to 140° C., preferably from 128° C. to 139° C., and Melt Flow Rate (MFR, measured according to ASTM D 1238, 230° C./2.16 kg, i.e. at 230° C., with a load of 2.16 kg) from 0.1 to 3 g/10 min.

The said amounts of hexene-1 units are referred to the total weight of the copolymer. The said melting temperature values are determined by differential scanning calorimetry, according to ISO 11357-3, with a heating rate of 20° C./minute.

Recurring units derived from other comonomers, selected in particular from ethylene and $CH_2=CHR$ α-olefins where R is a $C_2$-$C_8$ alkyl radical, hexene-1 excluded, can be present, provided that the final properties of the copolymer are not substantially worsened. Examples of the said $CH_2=CHR$ α-olefins are butene-1, 4-methyl-1-pentene, octene-1. Among the said other comonomers, ethylene is preferred.

Indicatively, the total amount of recurring units derived from comonomer(s) different from propylene and hexene-1 in the copolymer of the present invention is from 0.5 to 2% by weight, referred to the total weight of the copolymer.

From the above definition, it is evident that the term "copolymer" includes polymers containing more than one kind of comonomers, such as terpolymers.

Moreover, the copolymer of the present invention is semicrystalline, as it has a crystalline melting point, and typically has a stereoregularity of isotactic type.

Preferably, said copolymer exhibits at least one of the following features:
A solubility in xylene at room temperature (i.e. about 25° C.) equal to or lower than 25% by weight, preferably equal to or lower than 20% by weight.
Isotacticity Index equal to or higher than 97%, determined as m diads/total diads using $^{13}$C-NMR;
A molecular weight distribution expressed by the $\overline{Mw}/\overline{Mn}$ ratio, measured by GPC, (Gel Permeation Chromatograpy), from 4 to 7.

It has been found that the above said combination of Melt Flow Rate and melting temperature, characterizing the copolymers of the present invention, can be obtained with polymerization processes carried out in the presence of stereospecific Ziegler-Natta catalysts supported on magnesium dihalides. By properly dosing the molecular weight regulator (preferably hydrogen), the said combination of Melt Flow Rate values and corresponding melting temperature values is achieved, when the amount of recurring units derived from hexene-1 is within the above said range of from 5 to 9% by weight.

The polymerization process, which can be continuous or batch, is carried out following known techniques and operating in liquid phase, in the presence or not of inert diluent, or in gas phase, or by mixed liquid-gas techniques. It is preferable to carry out the polymerization in gas phase.

Polymerization reaction time, pressure and temperature are not critical, however it is best if the temperature is from 20 to 100° C. The pressure can be atmospheric or higher. As previously mentioned, the regulation of the molecular weight is carried out by using known regulators, hydrogen in particular.

The said stereospecific polymerization catalysts comprise the product of the reaction between:
1) a solid component, containing a titanium compound and an electron-donor compound (internal donor) supported on magnesium dihalide (preferably chloride);
2) an aluminum alkyl compound (cocatalyst); and, optionally,
3) an electron-donor compound (external donor).

Said catalysts are preferably capable of producing homopolymers of propylene having an isotactic index higher than 90% (measured as weight amount of the fraction insoluble in xylene at room temperature).

The solid catalyst component (1) contains as electron-donor a compound generally selected among the ethers, ketones, lactones, compounds containing N, P and/or S atoms, and mono- and dicarboxylic acid esters.

Catalysts having the above mentioned characteristics are well known in the patent literature; particularly advantageous are the catalysts described in U.S. Pat. No. 4,399,054 and European patent 45977.

Particularly suited among the said electron-donor compounds are phthalic acid esters and succinic acid esters.

Suitable succinic acid esters are represented by the formula (I):

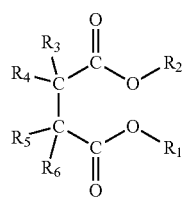

(I)

wherein the radicals $R_1$ and $R_2$ equal to or different from each other, are a C1-C20 linear or branched alkyl, alkenyl, cycloalkyl, aryl, arylalkyl or alkylaryl group, optionally containing heteroatoms; the radicals $R_3$ to $R_6$ equal to or different from each other, are hydrogen or a C1-C20 linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably C1-C8 alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from C1-C20 linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred. Other electron-donors particularly suited are the 1,3-diethers, as illustrated in published European patent applications EP-A-361 493 and 728769.

As cocatalysts (2), one preferably uses the trialkyl aluminum compounds, such as Al-triethyl, Al-triisobutyl and Al-tri-n-butyl.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical). Examples of the said silicon compounds are those of formula $R_a^1R_b^2Si(OR^3)_c$, where a and b are integer numbers from 0 to 2, c is an integer from 1 to 3 and the sum (a+b+c) is 4; $R^1$, $R^2$, and $R^3$ are alkyl, cycloalkyl or aryl radicals with 1-18 carbon atoms optionally containing heteroatoms.

Thexyltrimethoxysilane (2,3-dimethyl-2-trimethoxysilyl-butane) is particularly preferred.

The previously said 1,3-diethers are also suitable to be used as external donors. In the case that the internal donor is one of the said 1,3-diethers, the external donor can be omitted.

The catalysts may be precontacted with small quantities of olefin (prepolymerization), maintaining the catalyst in supension in a hydrocarbon solvent, and polymerizing at temperatures from room to 60° C., thus producing a quantity of polymer from 0.5 to 3 times the weight of the catalyst.

The operation can also take place in liquid monomer, producing, in this case, a quantity of polymer up to 1000 times the weight of the catalyst.

The copolymer of the present invention can also contain additives commonly used for olefin polymers like, for example, nucleating and clarifying agents and processing aids.

Suitable clarifying agents include the acetals of sorbitols and xylitols as well as phosphate ester salts. Many such clarifying agents are disclosed in U.S. Pat. No. 5,310,950. Specific examples of acetals of sorbitols include dibenzylidenesorbitol or its $C_1$-$C_8$-alkyl-substituted derivatives such as methyldibenzylidenesorbitol, ethyldibenzylidenesorbitol or dimethyldibenzylidenesorbitol. Examples of suitable commercially available sorbitol-acetal clarifying agents are those designated as Millad 3940 and Millad 3988, both available from Milliken Chemical. Specific examples of phosphate ester salts include 2,2'-methylenebis (4,6,-di-tert-butylphenyl)phosphate sodium or lithium salt. Examples of commercially available phosphate ester salts for use as clarifying agents include ADK stabilizer NA-71 and ADK Stabilizer NA-21, both available from Amfine Chemical Corp. Particularly preferred clarifying agents are 3,4-dimethyldibenzylidenesorbitol; aluminum-hydroxy-bis[2,2'-methylene-bis(4,6-di-t-butylpheny)phosphate]; sodium 2,2'-methylene-bis(4,6-ditertbutylphenyl)phosphate and other clarifying agents different from sorbitols and phosphate ester salts such as N,N',N"-tris-isopentyl-1,3,5-benzene-tricarboxoamide, bicyclo[2.2.1]heptane-2,3-dicarboxylic acid disodium or calcium salt (1R,2R,3R,4S) or the commercial nucleating agent NJ Star PC1. Combinations of any of the above may also be employed.

The clarifying agent may be added to the copolymer of the present invention by known methods, such as by melt blending the clarifying agent and the copolymer under shear condition in a conventional extruder.

Preferred amounts of clarifying that can be added to the copolymer of the present invention are up to 2500 ppm, more preferably from 100 to 2000 ppm by weight (with respect to the total weigh of the copolymer and the clarifying agent).

Particular examples of processing aids are fluoropolymers, such as Dynamar FX5911, sold by 3M, and other equivalent polymer materials known in the art.

As previously said, the present invention provides also a blown film comprising the said copolymer of propylene with hexene-1 containing from 5 to 9% by weight of recurring units derived from hexene-1, said copolymer having a melting temperature from 125° C. to 140° C., preferably from 128° C. to 139° C., and Melt Flow Rate (ASTM D1238, 230° C./2.16 Kg) from 0.1 to 3 g/10 min.

The blown film may be prepared by the processes and with the related equipment generally used in the technique of blown films.

The technique of blown film (also referred to as the Tubular Film) extrusion is well known for the production of thin plastic films. The process involves extrusion of a molten thermoplastic resin through a circular die, followed by "bubble-like" expansion of the molten web.

Standard practice favors single-screw extruders with barrel diameters of 25 to 200 mm for melting thermoplastic resins and homogeneously melting and delivering the molten polymer to the die head. Two different type of feed sections, either smooth or grooved, are commonly used.

Conventional extruders with a smooth feed are sometimes encountered on blown film line, but have a narrow operating range for screw speed and output. Usually the output achieved with a die of given flow resistance does not increase in proportion to an increase in screw speed. With a constant screw speed, the output decreases with increasing die resistance. The melt temperature becomes disproportionately high with increasing pressure and screw speed. The barrel heaters are set so that the barrel wall temperature increases in the direction of flow. The bulk of the energy required for plastification is imparted to the melt by shear forces, i.e. by converting the mechanical drive energy into heat. The conveying behavior of conventional extruders is dependent on the temperature of the extruder barrel, as the temperature influences the friction conditions in the extruder. In order for the melt to be conveyed, the friction between the plastic and the barrel must be greater than that between the plastic and the screw. The conveying capacity of the screw is largely governed by the pressure in front of the screw tip. This pressure, in turn, is dependent on the flow rate, the die resistance, the extrusion temperature and the flow characteristics of the melt. For this reason, the geometry of the die must be brought into line with that of the screw.

For the most part, blown film lines are manufactured with a grooved feed section. The friction is governed predominantly by the geometry of the barrel wall. In order to maintain a high conveying rate, the grooved section must be intensively cooled. The design of the extruder barrel must ensure good thermal isolation between the cooled grooved section and the heated barrel. The raw material properties that determine the conveying rate are density, coefficient of friction and pellet form.

The different conveying mechanisms in extruders with grooved and with smooth feed sections necessitate different screw geometries. For example, the flight depth in the feed section of an extruder with a smooth feed section must be considerably larger than in an extruder with a grooved feed section. In both systems, the screws generally have a barrier zone.

The use of shear and mixing sections is recommended for practically all screw geometries on extruders with grooved feed sections. Shear sections ensure in particular the residual plastification. Thanks to the high shear stresses in the narrow melt channels, they also contribute to breaking down filler agglomerations and colouring pigments. The most widespread are spiral shear sections and Maddock shear sections.

In contrast to the shear sections, the main function of the mixing sections is melt distribution. Their homogenizing effect derives from the intensive mixing of the melt. Apart from the established pin type, slotted disc and transverse bore mixing sections, mixing sections in which cavities are machined into the inner wall of the extruder barrel and into the screw, are also suitable for the processing of thermoplastic resins.

Extruders allow blown film line outputs of between 5 and 1500 kg/h. Almost all machine manufacturers today provide equipment with a screw length of 30 times the screw diameter (30D) as standard for single-screw extruders. Melt filters hold back impurities carried into the extruder with the plastic pellets and prevent the die from becoming blocked or damaged. Melt filters are therefore particularly important when processing regrind and non-virgin material. The installation of a screen changing device is advisable. Manual or semiautomatic changing devices are generally sufficient.

The screen pack in the melt filter allows the pressure in front of the screw tip to be influenced. In many cases, a selective pressure adaptation improves the homogenizing effect of the screw. Only screens of stainless steel should be used. Screens of brass or copper can result in catalysis, causing cross-linking of thermoplastic resins such as polyethylene.

Blown film lines are equipped with at least one and with up to nine different extruders feeding a die assembly. Coextrusion systems for making multilayer films employ at least two extruders feeding a common die assembly. The number of extruders is dependent upon the number of different materials comprising the coextruded film. For each different material, a different extruder is advantageously used. Thus a five-layer coextrusion may require up to five extruders although less may be used if two or more of the layers are made of the same material. The term "coextrusion" refers here to the process of extruding two or more materials through a single die with two or more orifices arranged such that the extrudates merge together into a laminar structure, preferably before chilling or quenching.

In the blown film process, the molten polymer feeding the die assembly is forced through an annular die. Air is introduced via a hole in the centre of the die to blow up the tube like a balloon. The bubble that is formed is hauled-off at a higher speed than the die outlet speed. It is intensively cooled by a current of air so that the temperature at the frost line is lower than the crystallite melting point. The bubble dimensions are fixed here. The bubble is then collapsed, trimmed if necessary, and rolled-up using a suitable winding system.

In modern tubular film plants, the common extrusion direction is vertical upwards. When producing smaller film formats, machines are still used in which the film bubble is extruded downwards. The films produced by these processes have gauges ranging from 8 to 250 μm. Spiral mandrel dies with vertical orientation of the spirals are almost exclusively used for the production of single-layer blown films. The dies generally have a ring diameter of between 50 and 2000 mm. The gap die width normally lies between 0.8 and 2.5 mm. The choice of gap width is primarily dependent on the thermoplastic resin to be extruded. The rheologically correct design of the die is a major determining factor for the uniformity of the film gauge.

For many years, the production of multi-layer blown films was only possible using dies in which the individual melt streams were passed through concentrically arranged spiral dies with vertical orientation of the spiral channels which are then joining only just before the die exit.

It is now more conventional to use "stack" dies, which consist of a number of stacked plates—one for each melt stream—each containing a spiral flow channel. The individual melt streams are merged together in succession. Some stack dies allow separate temperature control of each plate. The long flow path of the merged melt streams can prove a disadvantage in some cases.

Most machine manufacturers today offer both stack dies and multi-layer dies. Multilayer dies are generally used for film with up to three layers. Stack dies are more commonly used for films with five and more layers.

Uniform cooling around the circumference of the film bubble is an important precondition for ensuring the bubble has minimal diameter and gauge fluctuations. One or more air cooling rings are used for cooling down the molten bubble emerging from the die below the crystallization line which forms in the bubble. The air current generated by a fan is guided by the cooling ring at a defined speed along the outer surface of the bubble. The volume, velocity and temperature of the cooling air determine the geometry of the film bubble in the bubble expansion zone.

Uniform film production at increased throughput demands cooling air with a constant temperature. For this reason, ambient air is not recommended for cooling. Chilled air, on the other hand, allows uniform and constant production conditions. In addition, it increases the cooling capacity and hence the output of a blown film line. It should be noted, however, that air temperature below 10° C. can cause humidity in the air to condense on the surface of the cooling ring. This then impairs the production process.

Most efficient single cooling rings are dual lipped. With this cooling ring type, air arrives at the film bubble via two outlet gaps. This improves the bubble stability, in particular during the processing of thermoplastic resins with low melt viscosity, which can thus be processed with a comparatively high output through the use of twin lip cooling rings.

Cooling air rings can also be used in combination to cool down the blown film bubble at different positions between the die lips and the crystallization line. In a modern configuration, two air rings are used in combination. The lower air ring is conventionally fixed to the die, whereas the upper cooling ring can be moved up and down to facilitate line start up operations but also precise adjustment of the position and intensity of the air flow reaching the external bubble surface.

Almost all modern blown film extrusion lines allow the air inside the film bubble to be exchanged. This so-called internal bubble cooling (IBC) increases the cooling capacity and contributes to stabilizing the film bubble, therefore enhancing throughput capability of the blown film process. In order to ensure a well-controlled exchange of air inside the film bubble, the bubble diameter is continuously monitored using ultrasonic sensors or mechanically sensing arms.

The design of the cooling facility has a significant influence on the form of the film bubble. Typically, the expansion ratio between die and blown tube of film would be 1.5 to 5 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

The tube of film then continues upwards, continually cooling, until it passes through nip rolls where the tube is flattened to create what is known as a 'lay-flat' tube of film.

Between the frost line and collapsing frames, the inflated film bubble passes through a calibrating basket which stabilizes the film bubble and provokes disturbance in the cooling air flow, thus enhancing thermal exchange between cooling air and film surface. Height and diameter of the calibrating basket can generally be varied according to bubble size and stability requirements. It is common for the adjustable guide arms of the basket to be fitted with small PTFE rollers.

Apart from the gauge tolerance, the flatness is one of the most important quality criteria for blown film. For this reason, blown film extrusion lines must be equipped with a suitable collapsing and haul-off device. Collapsing devices with wooden slatted boards are common, but on modern equipment the collapsing boards are equipped with self-rotating brush systems, aluminum or carbon fiber rollers. It is very common for the bubble collapsing angle and the position of the lateral triangles to be controlled by motors. This technique enables the machine operator to adjust the collapsing device quickly at size changes from a remote control panel. These adjustment facilities enable drag and side creases to be avoided.

The collapsing boards are positioned immediately before the main haul-off system, which is made of two mechanically driven, rotating calendars which are pressing the collapsed bubble into a flat tubing. Rubber-coated squeeze rolls have proven to be effective for the film haul-off. In many cases, only one of the two haul-off rolls is rubber coated. The second roll serves as a chill roll and helps to increase the output of the film line. This lay-flat or collapsed tube is then taken back down the extrusion tower via more rollers.

Even modern machine engineering cannot prevent film bubbles exhibiting slight deviations in gauge in transverse direction. To prevent thick and thin area from developing in the film roll during winding and causing the formation of "piston rings", machine manufacturers have now developed devices which shift differences in film gauge backwards and forwards during winding, permitting the formation of cylindrical film reels without deformations.

In reversing haul-off devices, the reversing bars can be arranged horizontally or vertically. The benefit of vertical systems is the comparatively simple construction and the price. Horizontal systems offer technical benefits, particularly with very wide and very thin film, but are more expensive. In the meantime reversing bar systems have more or less completely superseded systems in which the film die or the whole extruder platform rotates.

The lay-flat film is then either kept as such or the edges of the lay-flat are slit off to produce two flat film sheets and wound up onto reels. If kept as lay-flat, the tube of film can be made into bags, liners or covers by sealing across the width of film and cutting to make each bag, liner or cover. This is done either in line with the blown film process or at a later stage. Final cutting to size of the film is performed directly in front of the winder. The slitting unit can take the form of replaceable industrial blades or as circular blades (shear slitting) in conjunction with a grooved roll. An adjustable transverse stretching roll is generally installed in the inlet section of the slitting unit which ensures crease-free running. With blown films, slitting knives are frequently used to cut the flat tubing into two film webs without loss and without edge trimming using internal spreading and slitting devices.

When winding film, the winding characteristics must be adapted to the specific properties of the film such as friction behavior, rigidity, etc.

In order to produce relatively hard reels such as desired, the winding tension (i.e. the tension in the film) must remain constant when the reel diameter increases. The drive torque must therefore increase with the winding diameter.

A distinction is made between three winder types according to their basic design, namely contact winders, center winders and gap winders. In case of contact winders, an independently driven pressure roll is pressed against the reel surface and thus sets the winding reel in rotation. The winder shaft itself is normally not driven. Torque and speed of the pressure roll remain constant during the whole winding process. In case of the centre winder technique, the winder shaft is driven. Consequently the torque and speed must change during the winding process so that winding tension and haul-off speed remain constant. The gap winder is a combination of contact winder and centre winder, whereas pressure roll and reel do not contact one another; the gap between roll and reel is held constant during the winding process and the pressure roll and the winder shaft are driven separately. The combination of all the methods in one winder is also possible.

Modern high-performance winders are designed so that any of these three winding methods can be set. A dedicated DC motor with tension and characteristic control drives each winding point. Furthermore, such winders are equipped with a fully automatic reel changing system which also includes the cutting and laying-on of the film web. Reversing of the direction of rotation of the winding shafts allows the position of the two film sides (e.g. in case of surface pre-treatment) to be inverted. Thanks to their modular design, the winders can be employed either as single-station winders for flat tubing or as tandem winders for slitted, flat films.

The principal benefits of manufacturing film by the blown film process include the ability to produce tubing (both flat and gussetted) in a single operation, to regulate film width and thickness by control of the volume of air in the bubble, the output of the extruder and the speed of the haul-off, to eliminate end effects such as edge bead trim and non-uniform temperature that can result from flat die film extrusion, to obtain biaxial orientation (allowing uniformity of mechanical properties), and to manufacture co-extruded, multi-layer films for high barrier applications such as food packaging.

Thus the present invention provides also a blown film process, wherein the copolymer of propylene with hexene-1 of the present invention is used to produce at least one layer of the film.

In the said process it is preferable to operate according to the following main settings and conditions:

The extrusion is preferably performed with grooved feed bore extruders and with a modern screw with a dual-flight barrier element. Still more preferably, the extrusion screw is equipped with at least one additional mixing element.

The screw length is preferably from 20 to 40 times the screw diameter, more preferably from 25 to 35 times the screw diameter. Most preferably, the screw length is from 27 to 33 times the screw diameter.

The barrel and die temperatures are generally from 160 to 270° C.

In particular, the extruder barrel temperature settings are preferably from 160 to 270° C., more preferably from 180 to 260° C., in particular from 200 to 250° C.

The melt temperature which is obtained with these temperature settings is preferably from 210 to 260° C., which can be in excess of the temperature settings due to the possibility of self-heating of the molten polymer under shearing stress conditions.

The die temperature is preferably from 200 to 270° C., more preferably from 210 to 250° C., in particular from 220 to 240° C.

Film extrusion is preferably performed in vertical upward direction.

The blow-up ratio is preferably from 2.2 to 4, more preferably from 2.4 to 3.6.

The die diameter can be any commercial die dimension, from 30 mm to 2 m or higher; preferably, the die diameter is from 100 mm to 1 m, more preferably from 150 mm to 650 mm.

Film cooling is performed with cooling fluids, which can be either in a liquid or in a gaseous state. In case of cooling with a liquid cooling medium, water is the preferred cooling medium, and the extrusion direction is preferably vertical downward. In case of cooling with a gaseous cooling medium, air is the preferred cooling medium, although other gases, such as nitrogen, can also be used, and the extrusion direction is preferably vertical upward.

In case of gaseous film quenching, the cooling is preferably done with at least one dual lip cooling ring, although a single lip cooling ring can also be used. Still preferably, internal bubble cooling (IBC) is used. The cooling medium temperature is preferably from 5 to 20° C., more preferably from 10 to 20° C., most preferably from 8 to 15° C.

Optionally, air cooling is performed with two cooling air rings, where the lower air ring (in case of vertical upward film extrusion) is non-movable in vertical direction and the position of the upper air ring can be moved in vertical direction, in order to allow further throughput increase in comparison with a single air ring cooling system.

The gap of the die ring (annular die gap) is preferably equal to or less than 3 mm, more preferably equal to or less than 1.8 mm, in particular from 0.6 to 3 or from 0.6 to 1.8 mm, most preferably from 0.8 to 1.8 mm.

Typical blown film applications include industry packaging (e.g. shrink film, stretch film, stretch hoods, bag film or container liners), consumer packaging (e.g. packaging film for frozen products, shrink film for transport packaging, food wrap film, packaging bags, or form, fill and seal packaging film), laminating film (e.g. laminating of aluminium or paper used for packaging for example milk or coffee), barrier film (e.g. film made of raw materials such as polyamides and EVOH acting as an aroma or oxygen barrier, used for packaging food, e. g. cold meats and cheese), films for the packaging of medical products, agricultural film (e.g. greenhouse film, crop forcing film, silage film, silage stretch film).

The thickness of the film of the present invention is generally below 250 µm, preferably below 150 µm. It can be a monolayer or multilayer film.

In the multilayer films, at least one layer comprises the copolymer of the present invention. It is preferable that at least the base layer (also called "support layer") comprise the copolymers of the present invention. The other layer(s) may comprise other kinds of polymers.

Examples of olefin polymers that can be used for the other layers are polymers or copolymers, and their mixtures, of $CH_2\!=\!CHR$ olefins where R is a hydrogen atom or a $C_1$-$C_8$ alkyl radical.

Particularly preferred are the following polymers:
a) isotactic or mainly isotactic propylene homopolymers, and homopolymers or copolymers of ethylene, like HDPE, LDPE, LLDPE;
b) Semi-crystalline copolymers of propylene with ethylene and/or $C_4$-$C_{10}$ α-olefins, such as for example butene-1, hexene-1, 4-methyl-1-pentene, octene-1, wherein the total comonomer content ranges from 0.05% to 20% by weight with respect to the weight of the copolymer, or mixtures of said copolymers with isotactic or mainly isotactic propylene homopolymers;
c) elastomeric copolymers of ethylene with propylene and/or a $C_4$-$C_{10}$ α-olefin, optionally containing minor quantities (in particular, from 1% to 10% by weight) of a diene, such as butadiene, 1,4-hexadiene, 1,5-hexadiene, ethylidene-1-norbornene;
d) heterophasic copolymers comprising a propylene homopolymer and/or one of the copolymers of item b), and an elastomeric fraction comprising one or more of the copolymers of item c), typically prepared according to known methods by mixing the components in the molten state, or by sequential polymerization, and generally containing the said elastomeric fraction in quantities from 5% to 90% by weight;
e) butene-1 homopolymers or copolymers with ethylene and/or other α-olefins.

Examples of polymers different from polyolefins, employable for the other layers, are polystyrenes, polyvynylchlorides, polyamides, polyesters and polycarbonates, copolymers of ethylene and vinyl alcohol (EVOH) and "tie layer" resins.

Finally, the films of the present invention can undergo a series of subsequent operations, such as:
surface embossing, by heating the surface and compressing it against an embossing roller;
printing, after having made the surface ink sensitive through oxidating (for instance flame) or ionizing treatments (for instance corona discharge treatment);
coupling with fabric or film, particularly of polypropylene, by heating of the surfaces and compression;
coextrusion with other polymeric or metallic materials (e.g. aluminum film);
plating treatments (depositing a layer of aluminum through evaporation under vacuum, for example);
application of an adhesive layer on one of the two faces of the film, thus producing an adhesive film.

Depending upon the specific kind of film and final treatment, the film of the present invention can find many uses, the most important of which is goods and food packaging.

The following examples are given to illustrate the present invention without limiting purpose.

The data relating to the polymeric materials and the films of the examples are determined by way of the methods reported below.

Melting Temperature (ISO 11357-3)

Determined by differential scanning calorimetry (DSC). A sample weighting 6±1 mg, is heated to 200±1° C. at a rate of 20° C./min and kept at 200±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 200° C.±1. The melting scan is recorded, a thermogram is obtained, and, from this, temperatures corresponding to peaks are read. The temperature corresponding to the most intense melting peak recorded during the second fusion is taken as the melting temperature.

Melt Flow Rate (MFR)

Determined according to ASTM D 1238, at 230° C., with a load of 2.16 kg.

Solubility in Xylene 2.5 g of polymer and 250 ml of xylene are introduced in a glass flask equipped with a refrigerator and a magnetical stirrer. The temperature is raised in 30 minutes up to the boiling pint of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Intrinsic Viscosity (IV)

Determined in tetrahydronaphthalene at 135° C.

1-Hexene Content and Isotacticity

Determined by $^{13}$C-NMR spectroscopy.

$^{13}$C-NMR spectra are acquired on a Bruker DPX-600 spectrometer operating at 150.91 MHz in the Fourier transform mode at 120° C.

The samples are dissolved in 1,1,2,2-tetrachloroethane-d2 at 120° C. with a 8% wt/v concentration. Each spectrum is acquired with a 90° pulse, 15 seconds of delay between pulses and CPD (WALTZ 16) to remove $^1$H-$^{13}$C coupling. About 1500 transients are stored in 32K data points using a spectral window of 6000 Hz.

The peak of the Propylene CH is used as internal reference at 28.83 ppm.

The evaluation of diad distribution and the composition is obtained from Sαα a using the following equations:

$$PP=100S\alpha\alpha(PP)/\Sigma$$

$$PH=100S\alpha\alpha(PH)/\Sigma$$

$$HH=100S\alpha\alpha(HH)/\Sigma$$

$$Where \Sigma=\Sigma S\alpha\alpha$$

$$[P]=PP+0.5PH$$

$$[H]=HH+0.5PH$$

$\overline{M}_w$ and $\overline{M}_n$

Measured by way of Gel Permeation Chromatography (GPC), preferably carried out in 1,2,4-trichlorobenzene; in detail, the samples are prepared at a concentration of 70 mg/50 ml of stabilized 1,2,4 trichlorobenzene (250 μg/ml BHT (CAS REGISTRY NUMBER 128-37-0)); the samples are then heated to 170° C. for 2.5 hours to solubilize; the measurements are run on a Waters GPCV2000 at 145° C. at a flow rate of 1.0 ml/min. using the same stabilized solvent; three Polymer Lab columns are used in series (Plgel, 20 μm mixed ALS, 300×7.5 mm).

Elmendorf Tear Strength

Determined according to ASTM D 1922 both in the machine direction (MD) and in the transverse direction (TD).

Puncture Resistance and Deformation

Determined from the energy required to puncture the film with a plunger (50 mm, diameter of 4 mm) with a rate of 20 mm/min, followed by measuring the deformation.

Haze

Determined according to ASTM Method D 1003.

Clarity

Determined according to ASTM D 1746.

Gloss at 45°

Determined according to ASTM D 2457.

Dart Test

Determined according to ASTM method D 1709A.

Tensile Modulus

Determined according to ASTM D882, both in the machine direction (MD) and in the transverse direction (TD).

Stress and Elongation at Yield and at Break

Determined according to ASTM D 882, both in the machine direction (MD) and in the transverse direction (TD).

Preparation of the Copolymer of Propylene with Hexene-1

The copolymer is prepared as follows.

The solid catalyst component used in polymerization is a highly stereospecific Ziegler-Natta catalyst component supported on magnesium chloride, containing about 2.2% by weight of titanium and diisobutylphthalate as internal donor, prepared by analogy with the method described in WO03/054035 for the preparation of catalyst component A.

Catalyst System and Prepolymerization Treatment

Before introducing it into the polymerization reactor, the solid catalyst component described above is contacted at 15° C. for about 6 minutes with aluminum triethyl (TEAL) and thexyltrimethoxysilane (2,3-dimethyl-2-trimethoxysilyl-butane), in a TEAL/thexyltrimethoxysilane weight ratio equal to about 7 and in such quantity that the TEAL/solid catalyst component weight ratio be equal to about 6.

The catalyst system is then subjected to prepolymerization by maintaining it in suspension in liquid propylene at 20° C. for about 20 minutes before introducing it into the polymerization reactor.

Polymerization

The polymerization is carried out in a gas phase polymerization reactor by feeding in a continuous and constant flow the prepolymerized catalyst system, hydrogen (used as molecular weight regulator), propylene and hexene-1 in the gas state.

The main polymerization conditions are:

Temperature: 75° C.

Pressure: 1.6 MPa;

molar ratio $H_2$/C3–: 0.0005;

molar ratio C6–/(C6–+C3–): 0.0453;

residence time: 96 minutes.

Note: C3–=propylene; C6–=hexene-1.

A polymer yield of 8400 g of polymer/g of solid catalyst component is obtained.

The polymer particles exiting the reactor are subjected to a steam treatment to remove the reactive monomers and volatile substances, and then dried.

The resulting propylene copolymer contains 7.3% by weight of hexene-1. Moreover said propylene copolymer has the following properties:

MFR: 0.3 g/10 min.;

Amount of fraction soluble in xylene: 18.1% by weight;

Melting temperature: 132.3° C.

Before using it to prepare films, the said copolymer of propylene with hexene-1 is extruded with additives, thus obtaining the copolymer materials COPO-1 and COPO-2.

COPO-1 is obtained by extruding the said copolymer with 500 ppm by weight of Dynamar FX5911.

COPO-2 is obtained by extruding the said copolymer with 500 ppm by weight of Dynamar FX5911 and 1800 ppm by weight of Millad 3988.

Dynamar™ FX5911 is a fluoropolymer sold by 3M for use as processing aid.

Millad 3988 is a clarifying agent based on bis(3,4-dimethyldibenzylidene) sorbitol.

Examples 1 and 2 and Comparison Examples 1 to 4

Three layer films are prepared on a Collin three layer coextrusion line. The film of Example 1 is prepared by using COPO-1 for all the three layers. The film of Example 2 is prepared by using COPO-2 for all the three layers.

In Comparison Example 1 the polymer material used for the all the three layers is a copolymer of propylene with butene-1 containing 15% by weight of butene-1 and having a MFR value of 0.8 g/10 min., previously extruded with 500 ppm by weight of Dynamar FX5911.

In Comparison Example 2 the same copolymer of propylene with butene-1 as in Comparison Example 1 is used for all the three layers, but previously extruded with 500 ppm by weight of Dynamar FX5911 and 1800 ppm by weight of Millad 3988.

In comparison Example 3 the polymer material used for all the three layers is copolymer of propylene with ethylene containing 5% by weight of ethylene and having a MFR value of 2 g/10 min., previously extruded with 1800 ppm by weight of Millad 3988.

In comparison Example 4 the polymer material used for all the three layers is a copolymer of propylene with ethylene containing 6.5% by weight of ethylene and having a MFR value of 2.3 g/10 min., previously extruded with 500 ppm by weight of Dynamar FX5911 and 1800 ppm by weight of Millad 3988.

All the said extrusions with Dynamar FX5911 and Millad 3988 are carried out in a co-rotating twin screw three lobs profile extruder (ZSK53 type, length/diameter ratio of 20, manufactured by Coperion Werner&Pfleiderer) under nitrogen atmosphere in the following conditions:

Rotation speed: 220 rpm;
Extruder output: 80 kg/hour;
Melt temperature: 250-260° C.

In the said Collin coextrusion line, the screw length/screw diameter ratios are 30 mm/30 xD for extruders A & C while 45 mm/30 xD for the B one. No IBCS system (Internal Bubble Cooling System) is used. During the extrusion trials, the melt is extruded through an annular die with a diameter of 100 mm and a quite narrow gap (0.8 mm for the trials). At the exit from the die, the melt tube is subjected to intensive air cooling, immediately blown up to about three times the diameter of the die and stretched in the direction of the flow.

The main operating conditions in Examples 1 and 2 are:
Barrel temperature: 200-240-220-220-220° C.;
Adaptor temperature: 220° C.;
Die temperature: 230-250-230-225-230° C.;
Screw speed: 30 rpm for all the three extruders;
Blow-up ratio: 3.1;
Line speed: 5.3 m/min.

In Comparison Examples 1 and 2 the same conditions as in Examples 1 and 2 are used, except for the following:
Screw speed: 50 rpm for all the three extruders;
Blow-up ratio: 3;
Line speed: 10 m/min.

In Comparison Examples 3 and 4 the same conditions as in Examples 1 and 2 are used, except for the following:
Barrel temperature: 200-240-220-210-210° C.;
Adaptor temperature: 210° C.;
Die temperature: 240-250-240-250-250° C. in Comparison Example 3 and 230-245-230-230-230° C. in Comparison Example 4;
Blow-up ratio: 2.8 in Comparison Example 3 and 2.9 in Comparison Example 4;
Line speed: 7 m/min.

The final film thickness of the films is approximately 50 micron, with a thickness distribution (in percentage) of 20/60/20.

The properties of the so obtained films are reported in Table 1.

TABLE 1

| EXAMPLE No. | | 1 | 2 | Comp. 1 | Comp. 2 | Comp. 3 | Comp. 4 |
|---|---|---|---|---|---|---|---|
| Elmendorf (MD) | g/μm | 1.3 | 1.1 | 0.5 | 0.4 | 0.2 | 0.3 |
| Elmendorf (TD) | g/μm | 1.8 | 1.7 | 1.1 | 0.8 | 0.3 | 0.4 |
| Puncture resistance | N | 9.7 | 12.8 | 7.2 | 11.1 | 9.5 | 7.5 |
| Puncture deformation | mm | 10.3 | 13.7 | 9.3 | 13.3 | 12.3 | 14.3 |
| Haze | % | 8.7 | 4.2 | 9.0 | 6.6 | 7.4 | 4.0 |
| Clarity | % | 96.1 | 98.1 | 88.3 | 87.4 | 95.0 | 92.5 |
| Gloss at 45° | ‰ | 63.5 | 80.0 | 63.0 | 69.8 | 63.8 | 75.1 |
| Dart test | g/μm | 11.33 | 7.47 | 2.27 | 1.43 | 1.32 | 1.54 |
| Tensile Modulus (MD) | MPa | 329 | 511 | 587 | 575 | 638 | 480 |
| Tensile Modulus (TD) | MPa | 321 | 518 | 606 | 645 | 671 | 515 |
| Stress at yield (MD) | MPa | 14.1 | 24.8 | 22.0 | 21.5 | 23.1 | 18.8 |
| Stress at yield (TD) | MPa | 14.2 | 23.0 | 20.3 | 20.8 | 22.2 | 18.5 |
| Elongation at yield (MD) | % | 14.9 | 15.9 | 13.1 | 12.5 | 15.1 | 16.0 |

TABLE 1-continued

| EXAMPLE No. | | 1 | 2 | Comp. 1 | Comp. 2 | Comp. 3 | Comp. 4 |
|---|---|---|---|---|---|---|---|
| Elongation at yield (TD) | % | 14.8 | 15.1 | 12.5 | 11.7 | 13.8 | 15.0 |
| Stress at break (MD) | MPa | 38.1 | 42.0 | 36.9 | 43.5 | 31.0 | 37.6 |
| Stress at break (TD) | MPa | 38.9 | 34.0 | 28.5 | 41.9 | 30.0 | 32.9 |
| Elongation at break (MD) | % | 668 | 670 | 700 | 850 | 870 | 1000 |
| Elongation at break (TD) | % | 718 | 626 | 710 | 990 | 970 | 1000 |

Note:
Comp. = Comparison

What is claimed is:

1. A blown film comprising:
a layer consisting essentially of a copolymer of propylene and hexene-1,
wherein the layer comprises from about 5 to about 9% by weight of recurring units derived from hexene-1 based upon the total amount of propylene and hexene-1,
wherein the copolymer has a melting temperature from 125° C. to 140° C., a molecular weight distribution from 4 to 7, and Melt Flow Rate (ASTM D1238, 230° C./2.16 kg) from 0.1 to 3 g/10 min.

2. The blown film of claim 1, wherein the blown film has a thickness of less than about 250 μm.

3. The blown film of claim 1, wherein the copolymer has a solubility in xylene at room temperature of less than or equal to 25% by weight.

4. The blown film of claim 1, wherein the copolymer further comprises a clarifying agent.

5. The blown film of claim 1, wherein the copolymer was formed by polymerizing the propylene and hexene-1 in the presence of a stereospecific Ziegler-Natta catalyst comprising a solid component comprising a titanium compound and an electron-donor compound supported on magnesium chloride, an aluminum alkyl compound and an external electron-donor compound.

6. The blown film of claim 5, wherein the external electron-donor compound is selected from silicon compounds comprising at least one Si—OR bond, where R is a hydrocarbon radical.

7. The blown film of claim 6, wherein the external electron-donor compound is thexyltrimethoxysilane.

8. The blown film of claim 1, wherein the blown film is processed into an article comprising the blown film, wherein the article is selected from the group consisting of an industrial package, a food package, a bag, a sack, a lamination film, a barrier film, an agriculture film, and a hygienic product.

9. The blown film of claim 1, wherein the blown film is blow molded into a film layer comprising at least the blown film.

10. The blown film of claim 9, wherein the blow molding process is carried out under the following conditions:
(i) screw length from 20 to 40 times the screw diameter;
(ii) barrel and die temperatures from 160 to 270° C.;
(iii) annular die gap equal to or less than 3 mm;
(iv) blow-up ratio from 2.2 to 4; and
(v) cooling medium temperature from 5 to 20° C.

* * * * *